Feb. 17, 1959  M. R. STUART  2,873,628
APPARATUS FOR OPERATING ON WORK PIECES
Filed Jan. 23, 1956  5 Sheets-Sheet 1

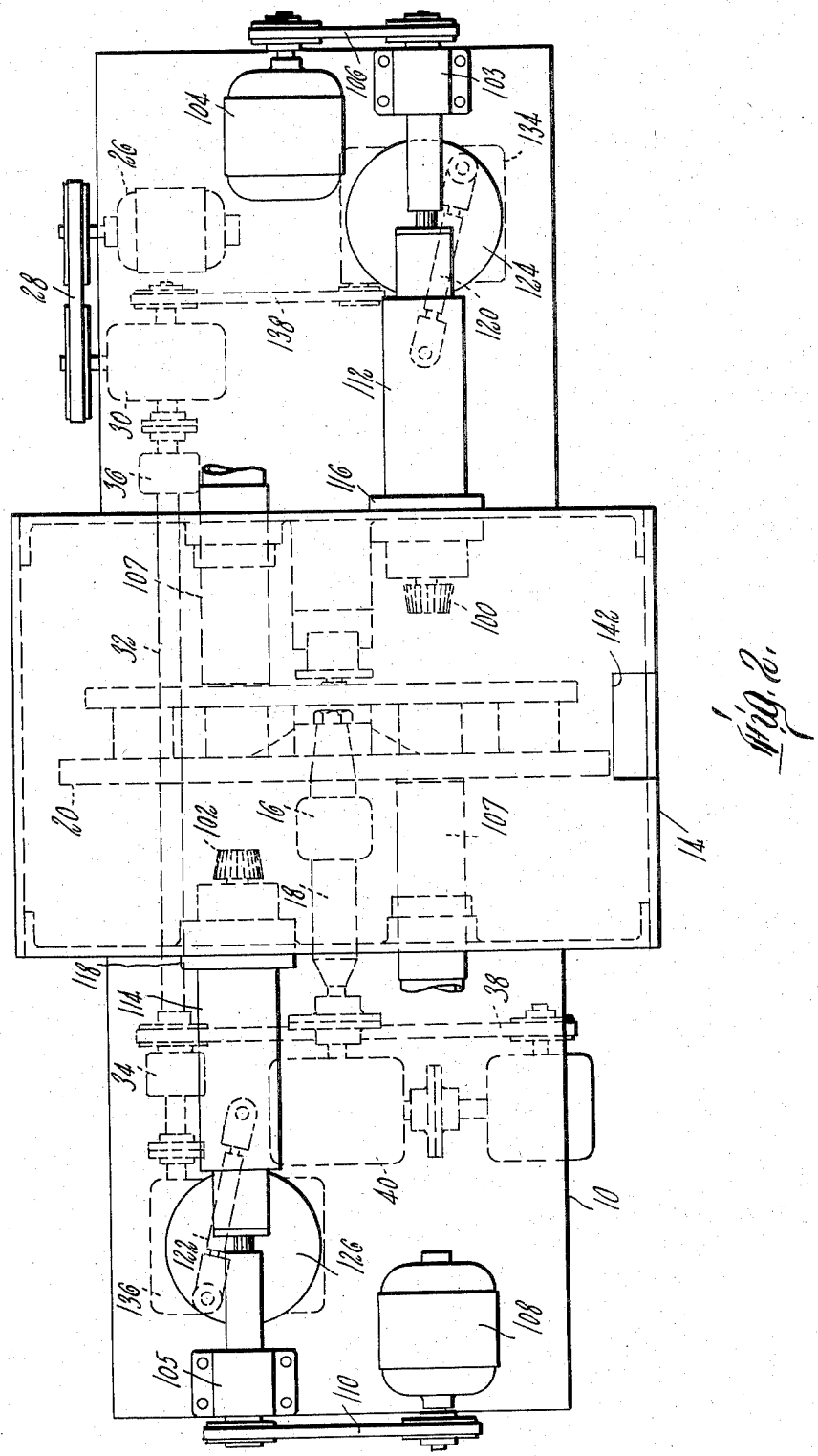

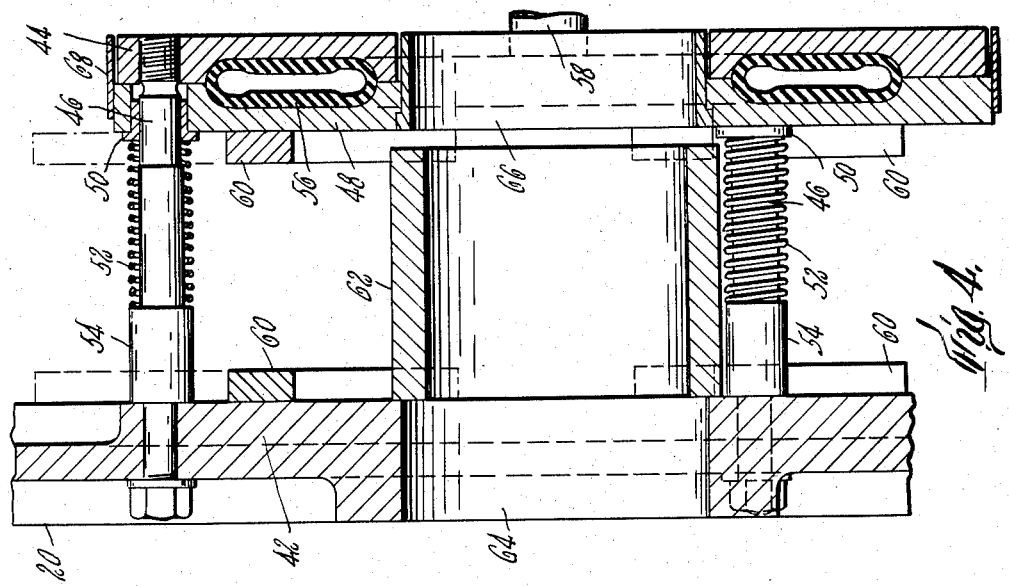
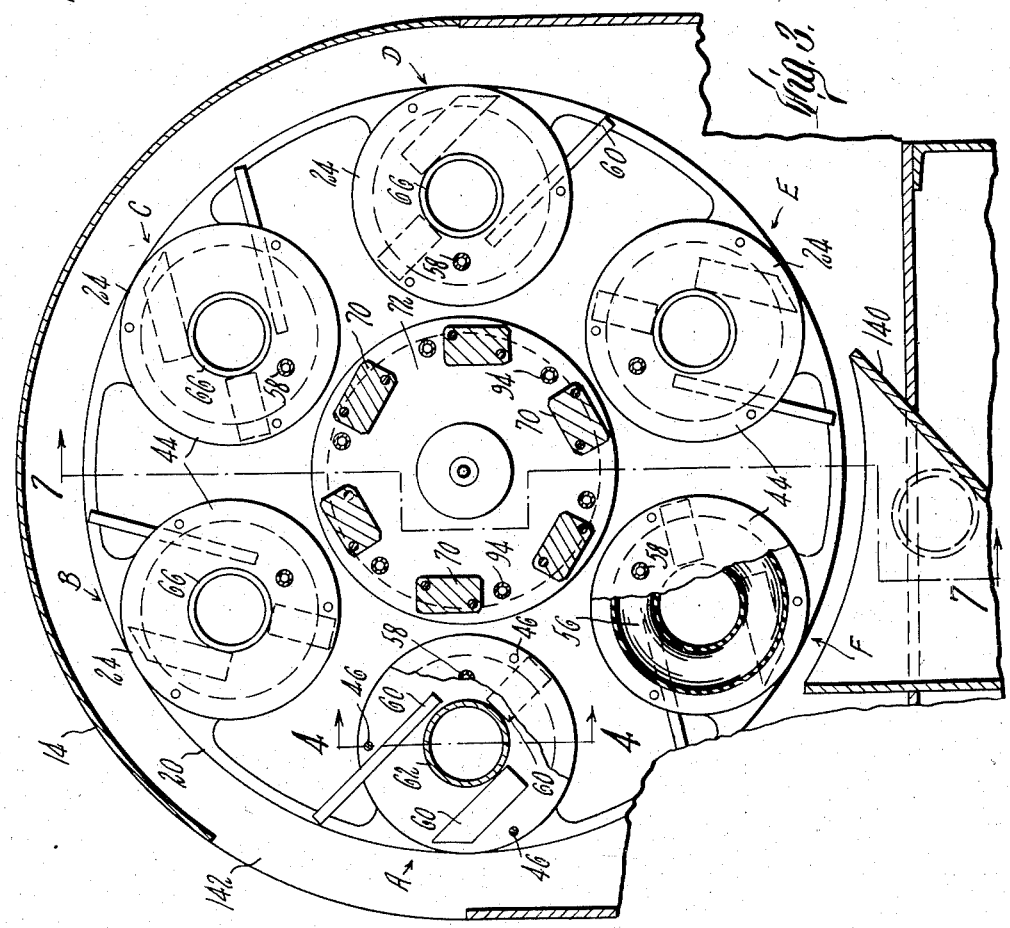

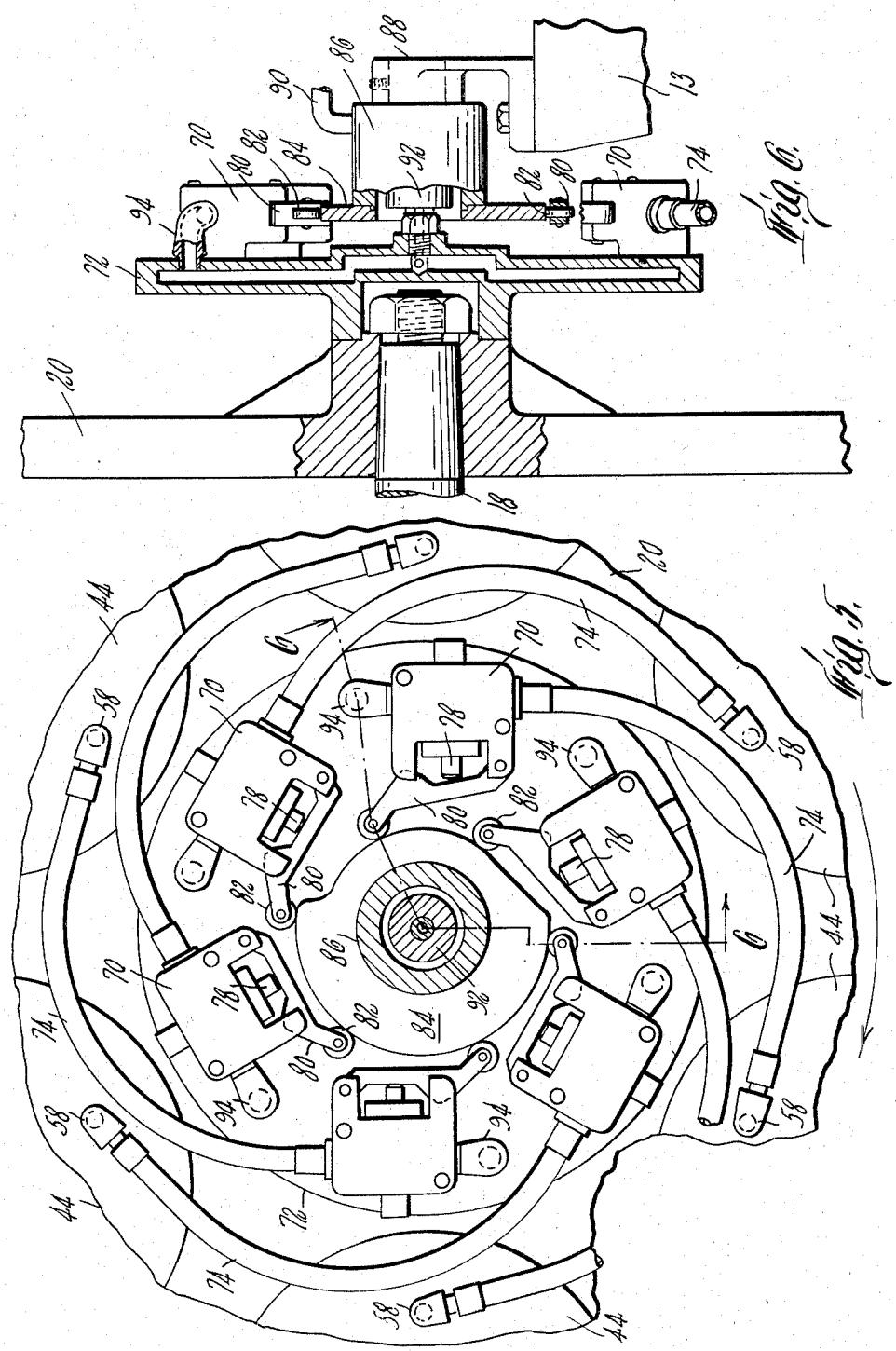

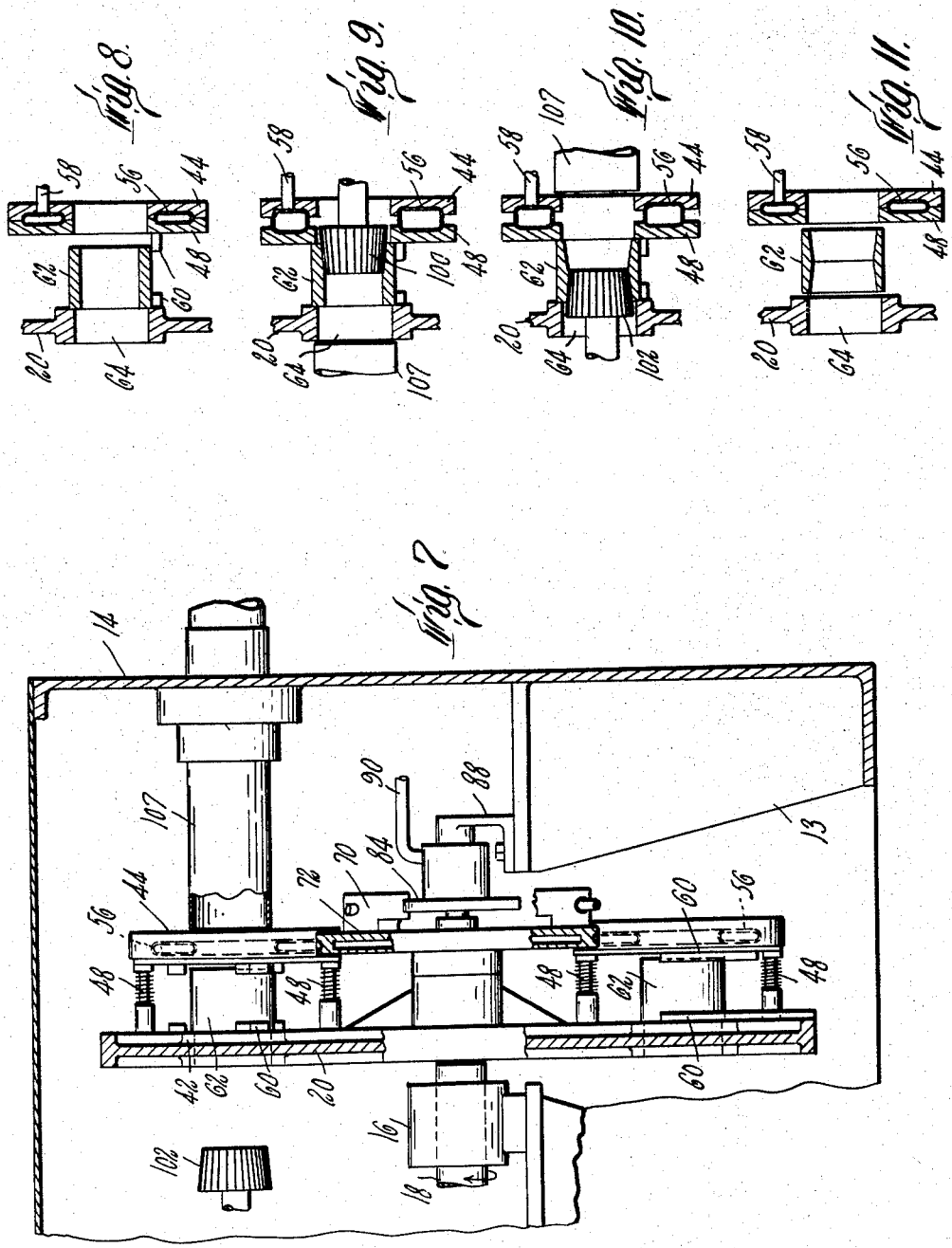

United States Patent Office 2,873,628
Patented Feb. 17, 1959

2,873,628
APPARATUS FOR OPERATING ON WORK PIECES

Meredith R. Stuart, Mechanic Falls, Maine, assignor to Brown Company, Berlin, N. H., a corporation of Maine Application January 23, 1956, Serial No. 560,696

8 Claims. (Cl. 77—21)

This invention relates to apparatus for operating on work pieces and pertains more specifically to apparatus for holding a work piece and advancing it two or more operating stations in succession, at each of which a desired operation such as a machining operation is carried out on the work piece.

One object of the invention is to provide apparatus of the type described of simplified and inexpensive construction in which the work-holding means or chuck is actuated by air or fluid pressure. Another object is to provide apparatus in which a plurality of chucks are mounted on a conveyor which advances them successively through a plurality of stations including loading, operating and unloading stations, the chucks preferably being mounted in circular array for intermittent rotation about the center of the array to advance each chuck stepwise through successive stations.

Still another object is to provide such an apparatus in which a tool is mounted at each operating station and means is provided for moving the tool into and out of operating engagement with each work piece while it is held at the operating station.

A further object is to provide apparatus of the type described for operating on the interior of hollow work pieces, each chuck having a pair of spaced gripping members for gripping opposite ends of the work piece and each gripping member having an aperture permitting access to the interior of the work piece through which the tool moves at the operating station.

Still a further object is to provide apparatus of the type described in which each chuck is actuated by the expansion of a flexible, expansible bladder, the expansion of each bladder being controlled by the advance of the chuck from station to station.

Still another object is to provide a chck of the type described having guide means for aligning the work piece with the gripping members of the chuck while the latter are in open position.

Other and further objects will be apparent from the drawings and the description which follows.

In the drawings:

Fig. 2 is a plan view of the embodiment shown in Fig. 1;

Fig. 3 is a view in cross section on an enlarged scale taken along the line 3—3 of Fig. 1;

Fig. 4 is a view in vertical section on an enlarged scale taken along the line 4—4 of Fig. 3;

Fig. 5 is a view in cross section on an enlarged scale taken along the line 5—5 of Fig. 1;

Fig. 6 is a view in section taken along the line 6—6 of Fig. 5;

Fig. 7 is a view in section taken along the line 7—7 of Fig. 3;

Fig. 8 is a fragmentary sectional view corresponding to the upper portion of Fig. 7 showing the position of the chuck at the loading station;

Fig. 9 is a view corresponding to Fig. 8 showing the position of the chuck and tool at a first operating station;

Fig. 10 is a view corresponding to Fig. 8 showing the position of the chuck and a second tool at a second operating station; and Fig. 11 is a view corresponding to Fig. 8 showing the position of the chuck at the unloading station.

Figure 1:
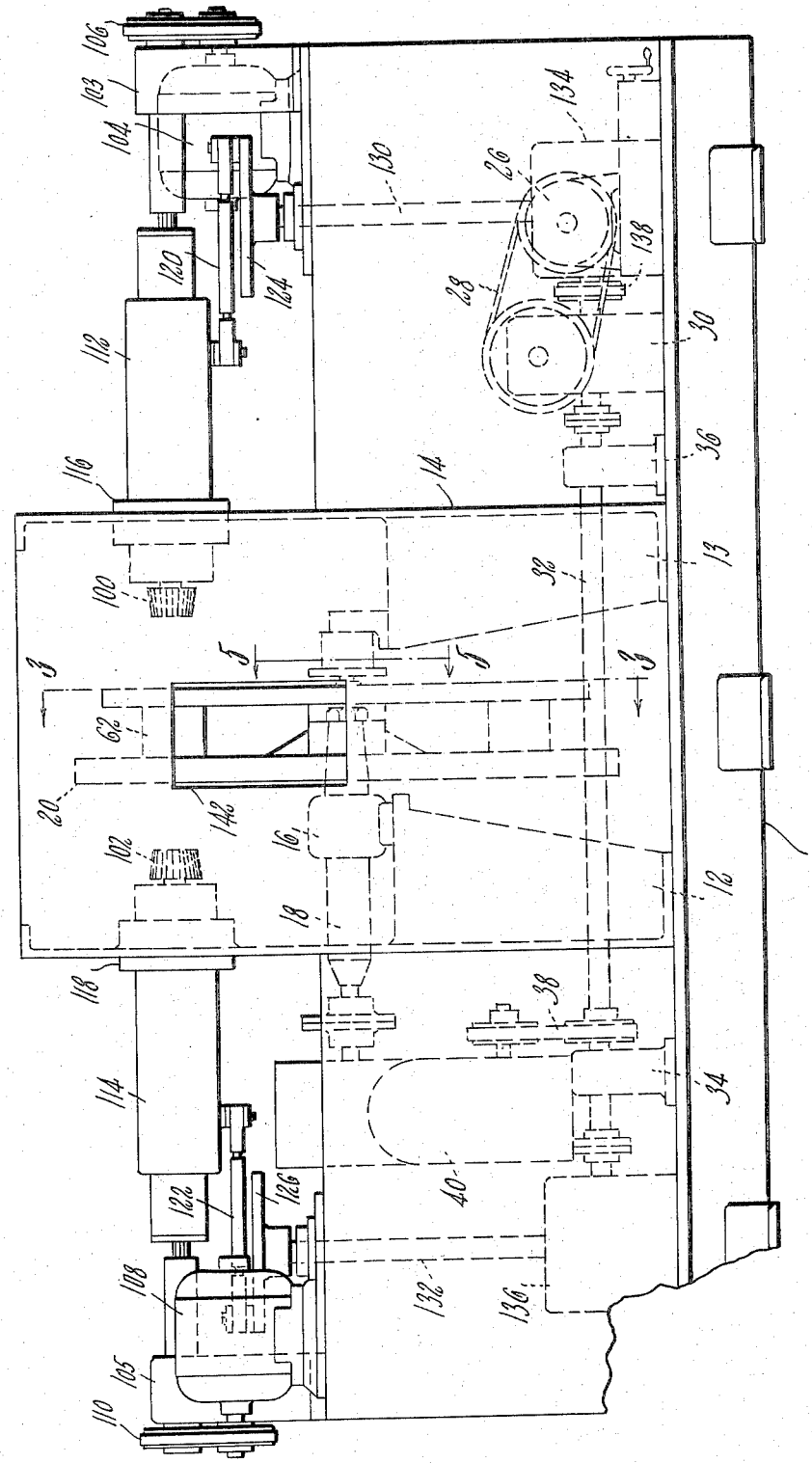
Fig. 1 is a view in front elevation of one embodiment of the invention.

In order to illustrate the nature of the invention, there is shown in the drawings an embodiment of the present invention suitable for use in internal chamfering of opposite ends of a fibrous pipe coupling, the chamfering of opposite ends being carried out at two successive operating stations; but it will be understood that any number of operating stations may be provided and that a variety of operations may be carried out at the several operating stations.

As shown in Fig. 1, the apparatus comprises main frame 10 on which are mounted a pair of supporting brackets 12, 13 enclosed within main housing 14. Mounted on bracket 12 is bearing 16 in which is journaled a shaft 18. Fixed to shaft 18 is a circular conveyor consisting of a generally circular plate 20 which rotates together with shaft 18. Conveyor plate 20 carries a plurality of chucks, indicated generally by the numeral 24, mounted in circular array for rotation about shaft 18, as shown best in Fig. 3. Shaft 18 is driven by motor 26 mounted on frame 10 which is connected by means of a suitable belt drive 28 to a speed reducer 30 which in turn is coupled to shaft 32 journaled in bearings 34, 36 mounted on frame 10. Chain drive 38 taken from shaft 32 serves to drive a conventional intermittent motion drive mechanism indicated generally by numeral 40 to which shaft 18 is coupled. It will be understood that motor 26 runs continuously and that conveyor plate 20 together with shaft 18 are rotated intermittently through drive mechanism 40 to advance chucks 24 stepwise through successive stations in their circular path.

In the embodiment of the drawings, the several stations are best shown in Fig. 3. When the conveyor plates are in the position shown in Fig. 3, the chuck at position A is at the loading station, the chuck at position B is at the first operating station, the chuck at position C is at the second operating station, the chuck at position D is at rest, the chuck at position E is ready to unload, actual unloading taking place at next move of conveyor 20, and the chuck at position F is empty to receive the next coupling blank at A. After the required time interval of dwell at the respective stations, conveyor plate 20 rotates clockwise as seen in Fig. 3 to advance each chuck to the next successive station, then stops again for the required dwell to permit the operations to be completed.

Each chuck, as best shown in Fig. 4, comprises a fixed gripping member 42, which may form an integral part of conveyor plate 20, together with backing member 44 mounted in fixed spaced relationship to gripping member 42 by means of spacing bolts 46, 46. Mounted between backing member 44 and fixed gripping member 42 is a movable gripping member 48 mounted on collars or bushings 50 which are slidable on bolts 46, 46 so that gripping member 48 is movable toward and away from gripping member 42. Compression coil springs 52, 52 mounted on each of spacing bolts 46 bear against bushings 50 at one end and against a collar 54 at the other end, collars 54, 54 abutting against the face of fixed gripping member 42. Springs 52, 52 therefore urge movable gripping member 48 away from fixed gripping member 42, tending to maintain the chuck in open position. Disposed between backing member 44 and movable gripping member 48 is a flexible, expansible bladder 56 of rubber or rubber-like material of generally annular form provided with a connection 58 permitting the introduction of air or other fluid into bladder 56 to expand it.

Secured to the opposing faces of gripping members 42, 48 are guide members 60, 60 which serve to support work piece 62 and align it properly with gripping members 42, 48 when the latter are in open position, as shown in Fig. 4. In the embodiment shown, work piece 62 is in the form of a hollow cylindrical pipe member, and the operation to be carried out on it is the chamfering of the interior surface (see Fig. 11) at opposite ends. Accordingly, an aperture 64 is provided in fixed gripping member 42 to permit access to the interior of the work piece. A similar aperture is provided in movable gripping member 48 together with a mating aperture in backing member 44. A collar 66 is mounted in the aperture in movable gripping member 48 to cover the gap between gripping member 48 and backing member 44 when the chuck is in closed position to avoid possible accumulation of dirt or debris between the two. Bladder 56 being annular in form surrounds the mating apertures in backing member 44 and movable gripping member 48 so that access to the right-hand end of the work piece as seen in Fig. 4 is provided through collar 66. An annular dust guard 68 is secured to the outer periphery of movable gripping member 48 and extends over the gap between gripping member 48 and backing member 44 when the chuck is in closed position for the same purpose as collar 66.

Actuating means for actuating each of the chucks when it is adjacent the loading and the unloading stations is provided in the form of a plurality of three-way valves 70, 70 mounted on a generally circular manifold plate 72 secured to the hub of conveyor plate 20, as best seen in Figs. 5, 6 and 7. Each valve 70 is connected by a suitable length of tubing 74, 74 to the inlet 58 of one of bladder members 56. Each valve 70 is opened or closed by means of a plunger 78 against which bears a pivoted arm 80 provided at its outer free end with a roller 82 which acts as a cam follower riding on fixed cam 84 as manifold plate 72 carrying valves 70, 70 rotates with shaft 18. Fixed cam 84 is mounted on housing 86 which in turn is secured to angle member 88 mounted on bracket 13.

The compressed air supply for bladders 56 is provided through supply line 90 whence it passes through a conventional rotary seal 92 mounted in housing 86 into the hollow interior of manifold plate 72, thence through inlets 94 communicating with valves 70. Each valve 70 is a three-way valve so that in one position the air supply is connected to bladder 56 while in the other position the air supply is shut off and bladder 56 is vented to the atmosphere.

In order to carry out the desired operations at each of the operating stations B and C, a chamfering cutter 100, 102 is mounted at each operating station, as shown in Figs. 1, 2 and 7, for movement through the apertures in the respective gripping members to operate on the interior of opposite ends of the work piece, successive tools 100, 102 being mounted at opposite sides of the path of advance of chucks 24. Each cutting tool 100, 102 is mounted on a telescoping drive shaft journaled in bearings 103, 105, tool 100 being driven from motor 104 through belt drive 106 and tool 102 being driven from motor 108 through belt drive 110. At each operating station B and C there is also mounted, at the opposite side of the chuck from tools 100, 102 respectively, an exhaust duct 107 with its end set at a running clearance from the extreme outside face of conveyor 20. Ducts 107 are connected to any suitable exhaust fan (not shown) and serve to remove chips produced by the cutters.

In order to advance the tools into operating position, the telescoping portion of the drive shaft is provided with a housing 112, 114 slidably mounted in bushing 116, 118 mounted in the wall of main housing 14. Each of housings 112, 114 is connected by a linkage 120, 122 to a rotating drive plate or crank 124, 126 (Figs. 1 and 2). Drive cranks 124, 126 are secured to drive shafts 130, 132 respectively. Shaft 130 is connected through gear box 134 and chain drive 138 to main drive shaft 32, while drive shaft 132 is driven from gear box 136 which is coupled directly to the other end of main staft 32. Accordingly, motor 26 serves to advance both tools 100, 102 into operating position and also serves to rotate conveyor 20, intermittent drive mechanism 40 being arranged to provide a timed relation so that conveyor 20 advances chucks 24 from one station to the next while tools 100, 102 are in retracted position and holds chucks 24 at their stations while tools 100, 102 advance into operating position.

In operation of the device, conveyor 20 carrying chucks 24, 24 is turned in a clockwise direction, as seen in Fig. 3, advancing the chucks successively from one station to the next. At loading station A the operator manually inserts a work piece 62 through loading aperture 142 in housing 14, allowing it to rest on and be guided by guide means 60 which bring it into alignment with the apertures in each of opposed gripping members 42, 48. At this station the chuck is in open position, gripping member 48 being urged to the right as seen in Fig. 8 by means of compression springs 52, bladder 56 being vented to the atmosphere through its respective valve which appears at the four o'clock position in Fig. 5. After the work piece has been inserted and cutting tools 100, 102 have been withdrawn outside the path of rotation of chucks 24 by rotation of drive cranks 124, 126, conveyor 20 is rotated clockwise by the intermittent drive mechanism 40 to move the chuck originally at station A to station B where it stops. During passage from station A to station B the valve connected with bladder 56 moves around stationary cam 84, as seen in Fig. 5, from four o'clock to six o'clock so that cam follower 82 and lever arm 80 actuate the valve from the position in which bladder 56 is vented to the atmosphere to the position in which bladder 56 is connected with the compressed air supply 90. Accordingly, by the time the chuck arrives at station B, bladder 56 has been inflated and has urged movable gripping member 48 to the left as seen in Fig. 9, gripping the end of work piece 62 and holding it firmly in position against fixed gripping member 42. After the chuck has arrived at station B, continued rotation of drive crank 124 advances the continuously rotating cutting tool 100 into the right-hand end of work piece 62 through the apertures in the gripping member and backing member, as shown in Fig. 9. After tool 100 has completed its operation and has been withdrawn from the work piece by continued rotation of drive crank 124, intermittent drive mechanism 40 again actuates conveyor plate 20 to move the chuck from position B to position C where it is held while cutting tool 102 is advanced into it and withdrawn as shown in Fig. 10. The chuck is then advanced to positions D and E which are idle positions at which no operations occur. As the chuck leaves position E, its corresponding valve, as seen in Fig. 5, advances from noon to two o'clock, cam follower 82 passing over the shoulder of fixed cam 84 during this movement to actuate the valve, shutting off the air supply and venting bladder 56 to the atmosphere. Compression springs 52, 52 urge the chuck to open position upon release of pressure in bladder 56, permitting the work piece to drop out of the chuck along guide members 60, 60 to fall into a suitable hopper or delivery chute 140. It will be apparent that each successive chuck operates in the same way as it passes through the successive stations.

Although specific embodiments of the invention have been described herein, it is not intended to limit the invention solely thereto, but to include all of the obvious variations and modifications within the spirit and scope of the appended claims.

I claim:

1. Apparatus for operating on a work piece comprising a conveyor mounted for stepwise rotation about an axis, a plurality of work-holding chucks mounted on said conveyor in circular array about said axis for movement through a plurality of stations including a loading station, an operating station and an unloading station, means for rotating said conveyor intermittently to advance said chucks stepwise from station to station, each chuck comprising a pair of spaced-apart work-gripping members, at least one of said pair of members being mounted for movement toward the other to grip the work therebetween and away from the other to release the work, a fluid pressure operated flexible expansible bladder mounted for movment with each chuck and operating in timed relation to the rotation of said conveyor to move said one gripping member of each chuck toward the other to grip the work while said chuck is advancing adjacent said loading station and to move said one gripping member away from the other to release the work while said chuck is advancing adjacent the unloading station, a tool mounted for movement toward and away from a position to operate on the work when the work is at the operating station, and means operating in timed relation to the rotation of said conveyor to move said tool to and from operating position while each piece of work is at said operating station.

2. Apparatus as defined in claim 1 in which each chuck comprises a backing member, a gripping member mounted in fixed spaced relation to said backing member, a movable gripping member mounted between said backing member and fixed gripping member for movement toward and away from the latter, and in which the flexible, expansible bladder is disposed between said backing member and said movable gripping member and means is provided for supplying fluid under pressure for expanding said bladder.

3. Apparatus as defined in claim 2 for operating on the interior of hollow work pieces in which said fixed gripping member has an aperture opening into said hollow interior and said tool moves to and from operating position through said aperture.

4. Apparatus as defined in claim 2 for operating on the interior of hollow work pieces in which said movable gripping member, bladder and backing member have mating apertures opening into said hollow interior and said tool moves to and from operating position through said apertures.

5. Apparatus as defined in claim 2 for operating on the interior of the hollow work pieces in which each fixed gripping member has an aperture opening into said hollow interior, each movable gripping member, bladder and backing member have apertures mating with each other opening into said hollow interior, and two operating stations are provided with a tool mounted at each station for movement to and from operating position through said apertures, one said tool moving through the aperture in the fixed gripping member and the other said tool moving through the apertures in the movable gripping member, bladder and backing member.

6. Apparatus for operating on opposite ends of a work piece comprising a plurality of chucks mounted in circular array about an axis for stepwise rotation about said axis through a plurality of stations including a loading station, a first operating station, a second operating station, and an unloading station, means for rotating said array to advance each chuck from station to station, each said chuck comprising a backing member, a gripping member adapted to engage one end of said work piece, said gripping member being mounted in fixed spaced relation to said backing member, and a movable gripping member adapted to engage the other end of said work piece, said movable gripping member being mounted between said backing member and said fixed gripping member for movement to and from the latter to grip and release said work piece, a flexible, expansible bladder mounted between said backing member and said movable gripping member, means actuated by rotation of said array for supplying fluid under pressure to each said bladder while it is advancing adjacent said loading station to inflate the bladder and urge said movable gripping member toward said fixed gripping member to grip the work piece therebetween and to release said fluid pressure while said bladder is advancing adjacent said unloading station, said fixed gripping member having an aperture to permit access to an end of said work piece and said movable gripping member, bladder and backing member having mating apertures permitting access to the other end of said work piece, a tool at said one operating station mounted at one side of the path of rotation of said array for movement through the aperture in said fixed gripping member to and from a position to operate on said work piece, a tool at said second operating station at the other side of the path of rotation of said array for movement through the apertures in said movable gripping member, a bladder and backing member to and from a position to operate on said work piece, and means operating in timed relation to the rotation of said array to move each tool to and from operating position while each chuck is at each operating station.

7. Apparatus as defined in claim 6 in which guide means are mounted on the opposing faces of said gripping members to align said work piece with said gripping members when the latter are in released position.

8. A chuck for holding a work piece comprising a backing member, a gripping member mounted in fixed spaced relation to said backing member for engaging one end of said work piece, a movable gripping member adapted to engage the other end of said work piece, said movable gripping member being mounted between said backing member and said fixed gripping member for movement toward and away from the latter to grip and release said work piece therebetween, a flexible, expansible bladder mounted between said movable gripping member and said backing member, and means for supplying fluid under pressure to said bladder to expand the same and urge said movable gripping member into gripping engagement with said work piece.

References Cited in the file of this patent

UNITED STATES PATENTS

| | | |
|---|---|---|
| 966,816 | Fischer | Aug. 9, 1910 |
| 1,692,567 | Lovejoy | June 12, 1934 |
| 2,093,111 | Montgomery | Sept. 14, 1937 |
| 2,531,395 | Carlson | Nov. 28, 1950 |
| 2,540,186 | Bullard et al. | Feb. 6, 1951 |
| 2,655,384 | Peterson | Oct. 13, 1953 |
| 2,660,074 | Wilson | Nov. 24, 1953 |

UNITED STATES PATENT OFFICE

CERTIFICATE OF CORRECTION

February 17, 1959

Patent No. 2,873,628

Meredith R. Stuart

It is hereby certified that error appears in the above numbered patent requiring correction and that the said Letters Patent should read as corrected below.

In the drawings, sheets 1 to 5, line 2, and in the heading to the printed specification, line 2, title of invention, for "APPARATUS FOR OPERATING ON WORK PIECES", in each occurrence, read -- MACHINE TOOL WITH FLUID-ACTUATED CHUCK --; in the printed specification, column 1, line 50, for "chck" read -- chuck --; column 4, line 7, for "staft" read -- shaft --; column 5, line 15, for "movment" read -- movement --; column 6, line 31, before "bladder" strike out "a"; same column 6, line 59, list of references cited, for the patent number "1,692,567" read -- 1,962,567 --.

Signed and sealed this 7th day of July 1959.

(SEAL)
Attest:

KARL H. AXLINE

Attesting Officer

ROBERT C. WATSON
Commissioner of Patents